United States Patent [19]

Christin et al.

[11] Patent Number: 5,296,171
[45] Date of Patent: Mar. 22, 1994

[54] METHOD FOR FABRICATING A CERAMIC FIBER REINFORCED COMPOSITE MATERIAL

[75] Inventors: Francois Christin, Saint Aubin de Medoc; Didier Mocaer, Gradignan; René Pailler, Cestas, all of France

[73] Assignee: Societe Europeene de Propulsion, Suresnes, France

[21] Appl. No.: 801,436

[22] Filed: Dec. 2, 1991

[30] Foreign Application Priority Data

Dec. 3, 1990 [FR] France .................. 90-15127

[51] Int. Cl.$^5$ .................. B29C 35/02; D01C 5/00; B29D 28/00
[52] U.S. Cl. .................. 264/22; 264/25; 264/292; 264/103
[58] Field of Search .................. 264/22, 60, 62, 66, 264/103, 23, 25, 29.2; 427/551

[56] References Cited

U.S. PATENT DOCUMENTS 4,968,460 11/1990 Thompson et al. .................. 264/22
5,034,356 7/1991 Brun et al. .................. 264/60
5,078,818 1/1992 Han et al. .................. 264/60

FOREIGN PATENT DOCUMENTS 0280387 8/1988 European Pat. Off.

*Primary Examiner*—Jan H. Silbaugh
*Assistant Examiner*—Christopher A. Fiorilla
*Attorney, Agent, or Firm*—Weingarten, Schurgin, Gagnebin & Hayes

[57] ABSTRACT

A method of fabricating a composite material including a matrix reinforced by ceramic fibers which are derived by ceramization of an organometallic precursor. The method includes the steps of irradiating the ceramic fibers with electromagnetic radiation of wavelength less than or equal to the wavelength of x-rays, and then impregnating or infiltrating a preform made of the irradiated ceramic fibers with a matrix forming material to form the composite. The method provides fibers and hence a composite material with improved mechanical behavior.

9 Claims, 1 Drawing Sheet

YOUNG'S MODULUS OF SIC ex PCS FIBERS
AS A FUNCTION OF RECEIVED DOSE

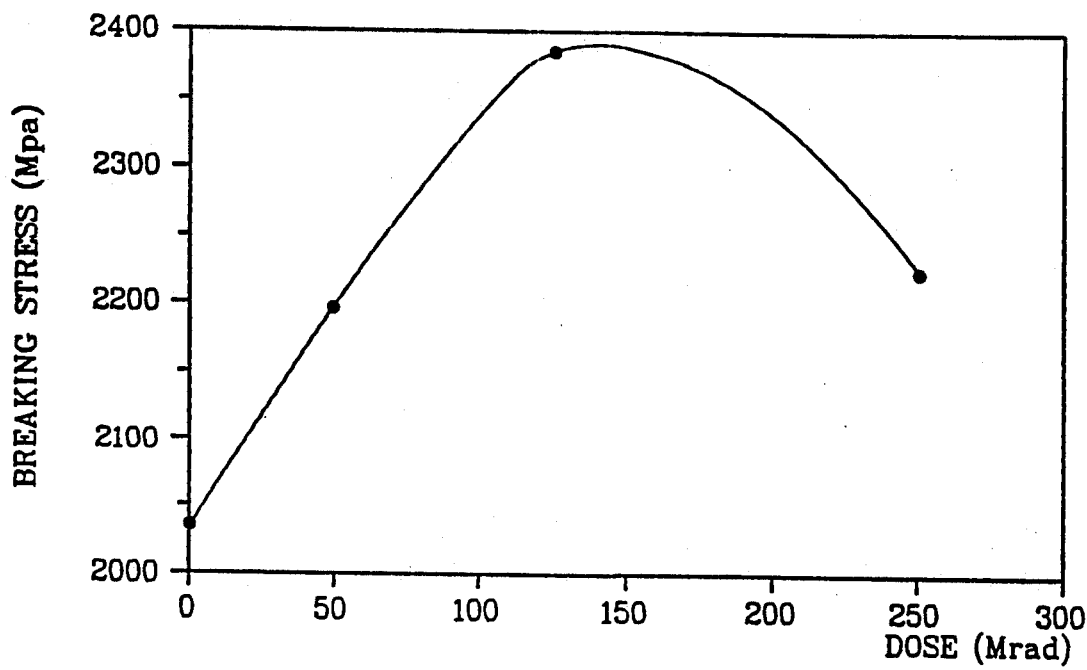
FIG. 1  BREAKING STRESS OF SIC ex PCS FIBERS AS A FUNCTION OF RECEIVED DOSE
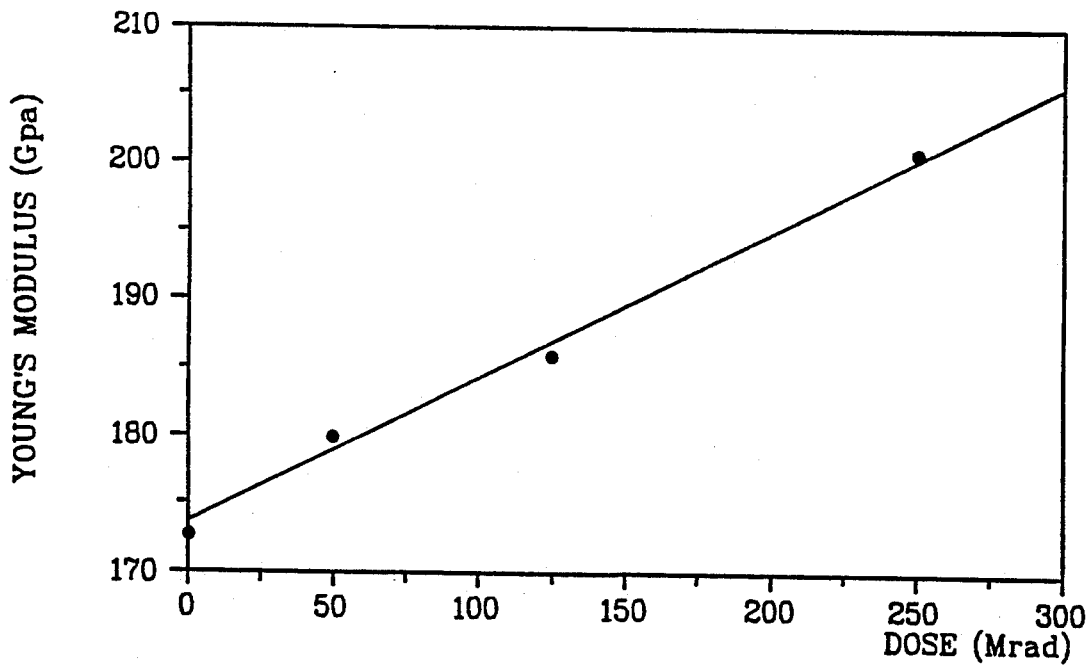
FIG. 2  YOUNG'S MODULUS OF SIC ex PCS FIBERS AS A FUNCTION OF RECEIVED DOSE

METHOD FOR FABRICATING A CERAMIC FIBER REINFORCED COMPOSITE MATERIAL

The present invention relates to fabricating a composite material having a matrix reinforced by ceramic fibers.

BACKGROUND OF THE INVENTION

To make a part out of such a composite material, the procedure is generally to make a fiber preform whose shape is similar to that of the part to be made, and then to densify the preform by infiltrating with the material that constitutes the matrix within the pores of the preform. Densification may be performed using a liquid (impregnation-pyrolysis cycle(s)) or by using a gas (chemical vapor infiltration cycle(s)).

The present invention seeks more particularly to fabricate a composite material reinforced by ceramic fibers, in particular fibers derived from organo-metallic precursors, e.g. fibers made essentially of silicon carbide or of silicon nitride and derived from organo-silicon precursors.

Compared with fibers obtained by chemical vapor deposition of a ceramic coating on a metal or a carbon core, fibers obtained by pyrolysis (ceramization) of an organo-metallic precursor are generally more suitable for being subjected to textile operations, in particular weaving, and they are cheaper. However, their mechanical properties are still limited.

An object of the present invention is to remedy these drawbacks by proposing a method enabling the mechanical behavior of these fibers to be improved, and consequently enabling the mechanical behavior of composite materials in which such fibers are used as reinforcement to be improved.

SUMMARY OF THE INVENTION

According to the invention, this object is achieved by the fact that the ceramic fibers, in particular fibers derived from an organo-metallic precursor, are irradiated after ceramization and before the matrix is formed, by being exposed to electro magnetic radiation constituted by X-rays or by rays of a shorter wavelength, preferably gamma rays.

The use of gamma rays or X-rays in the manufacture of ceramic fibers derived from organo-metallic precursors is known. Thus, in particular for fibers derived from organo-silicon precursors such as polycarbosilanes (PCS), polycarbosilazanes (PCSZ), and polysilazanes (PSZ), proposals have been made to irradiate the polymer fibers after extrusion and before ceramization heat treatment, with the purpose of the irradiation being to convert the polymer fibers to the non-meltable state.

According to the present invention, irradiation is performed on fibers that have already been ceramized, and, unexpectedly, this provides a substantial improvement in the mechanical properties of the fibers and of composite materials in which they constitute the reinforcement.

During irradiation, the ceramic fibers may be in any form whatsoever, e.g. threads, yarns, roving, strands, cables, cloth, felt, mats, and even two- or three-dimensional preforms. Depending on the form of the fiber texture to be irradiated, suitably penetrating radiation is selected. In this respect, gamma radiation is preferred because of its greater penetrating power due to its shorter wavelength.

When the irradiation causes an increase in the Young's modulus, it is advantageous to perform the treatment on fibers that have previously been subjected to a textile operation, e.g. weaving, so as to obtain a fiber texture constituted by fibers having a high Young's modulus, which fibers would be difficult or impossible to weave.

The dose of radiation lies in the range a few megarads to a few hundreds of megarads, typically in the range 10 megarads to 300 megarads. After prior testing, it may be selected as a function of the desired degree of change in the mechanical properties and as a function of the crystal state of the fiber and of its nature.

The radiation dose rate is selected, for example, to lie in the range a few tenths of a megarad per hour to a few megarads per hour, typically in the range 0.1 megarads/hour to 10 megarads/hour, but can reach about 1000 megarads/hour.

To reach the desired radiation dose, the duration of the treatment consequently lies in the range a few hours to a few hundreds of hours.

The temperature during the radiation treatment may be ambient temperature. However, in order to reduce the time required for irradiation while achieving the same result, the temperature may be chosen to be higher than ambient, up to 1000° C. The temperature rise may be constituted merely by the heating due to the radiation.

The nature of the atmosphere used during radiation treatment is immaterial so long as it is compatible with the nature of the fiber. For convenience, it is therefore preferable to perform irradiation in air or under an inert atmosphere (nitrogen or argon).

A piece made of composite material is made from a fiber preform of irradiated ceramic fibers by any known technique of infiltrating the matrix using a liquid or a gas. The material from which the matrix is made is selected as a function of the intended application of the part being made. For example, the matrix may be a ceramic material (such as silicon carbide formed by chemical vapor infiltration), or a vitreous material, or a vitroceramic material.

BRIEF DESCRIPTION OF THE DRAWING

Implementations of the invention are described by way of example with reference to the accompanying drawing, in which:

FIG. 1 is a graph showing how the breaking stress of a roving of silicon carbide based fibers varies as a function of the dose of radiation received; and FIG. 2 is a graph showing how the Young's modulus of the same roving of fibers varies as a function of the dose of radiation received.

DETAILED DESCRIPTION

In the examples below, the ceramic fibers in question are fibers having an organo-silicon precursor, and more precisely they are silicon carbide-based fibers (referred to as SiC fibers below) having a polycarbosilane (PCS) precursor.

EXAMPLE 1

SiC fibers are obtained by applying heat treatment to PCS fibers using the method described by E. Bouillon in thesis No. 307, Bordeaux 1989.

The fibers are inserted in the form of rovings into containers and they are placed in an irradiation chamber where they are subjected to gamma radiation from a cobalt source ($^{60}$Co) at a dose rate of about 0.5 megarad/hour. The treatment is performed in air at ambient temperature (i.e. without adding any heat other than that produced by the radiation). The containers are removed from the chamber after increasing exposure times and the rovings of treated fibers are traction tested at ambient temperature for a gauge length of 10 mm.

FIGS. 1 and 2 show the measured values of the breaking stress and of the Young's modulus for different durations of exposure to gamma radiation, i.e. for different radiation doses.

FIG. 1 shows that the breaking stress passes through a maximum with an improvement of about 20% for a dose of about 100 megarads.

FIG. 2 shows that the Young's modulus increases with the received dose of radiation, and an increase of 15% is observed for the maximum dose administered.

A small reduction in section of the fibers is observed after radiation treatment.

Depending on the priority mechanical characteristic that is being sought, the fibers may be treated in various different ways: relatively long exposure times corresponding to several hundreds of megarads radiation give rise to a major increase in Young's modulus, whereas intermediate treatment times corresponding to about 100 megarads give rise to maximum breaking stress.

EXAMPLE 2

The procedure is the same as in Example 1 using SiC fibers sold by the Japanese firm Nippon Carbon under the reference "Nicalon" "NLM 102".

The table below gives the values of the tensile stress $\sigma$ and of the Young's modulus E as measured on non-irradiated "NLM 102" fibers and on "NLM 102" fibers that have received about 150 megarads of gamma radiation with a dose rate of about 0.5 megarad/hour.

|  | "NLM 102" fibers | irradiated "NLM 102" fibers |
|---|---|---|
| $\sigma$(MPa) | 2800 | 3900 |
| E(GPa) | 170 | 270 |

The tensile stress is observed to increase by about 40% and the Young's modulus by about 60%.

EXAMPLE 3

The procedure is the same as in Example 1 using SiC fibers sold by the Japanese firm Nippon Carbon under the reference "Nicalon" "NLM 202". The table below gives the values of the tensile stress $\sigma$ and of the Young's modulus E as measured on non-irradiated "NLM 202" fibers and on "NLM 202" fibers that have received about 200 megarads of gamma radiation with a dose rate of about 0.5 megarad/hour.

|  | "NLM 202" fibers | irradiated "NLM 202" fibers |
|---|---|---|
| $\sigma$(MPa) | 2630 | 3250 |
| E(GPa) | 270 | 190 |

An increase in the tensile stress of about 20% is observed, whereas the Young's modulus decreases slightly.

EXAMPLE 4

A fiber preform in the form of a cube having a side of 2 cm is made using SiC fibers that are identical to those used in Example 1. The preform is obtained by cutting out and stacking layers of cloth made of SiC fibers.

The preform is inserted in an irradiation chamber where it is subjected to gamma radiation until it has received a radiation dose of about 120 megarads at a dose rate of about 0.5 megarad/hour.

After treatment, traction tests are performed on rovings of fibers taken from within the preform. It is observed that the results of the tests are comparable to those obtained in Example 1, which demonstrates good penetration of the gamma radiation into the core of the preform.

We claim:

1. A method of fabricating a composite material comprising a matrix reinforced by ceramic fibers, said method comprising the steps of:
   providing ceramic fibers derived from an organometallic precursor by ceramifying fibers formed from said organometallic precursor;
   irradiating the ceramic fibers by exposure to electromagnetic radiation of wavelength less than or equal to the wavelength of x-rays to improve the mechanical properties of the ceramic fibers; and
   densifying a preform made of said irradiated ceramic fibers by impregnating or infiltrating the preform with a material constituting the matrix to obtain the composite material.

2. A method according to claim 1, wherein said irradiating step is carried out on said ceramic fibers prior to forming said preform.

3. A method according to claim 1, wherein the ceramic fibers are subjected to a textile operation to obtain a fibrous texture and said irradiating step is carried out on said fibrous texture.

4. A method according to claim 1, wherein a preform is formed from said ceramic fibers, and said irradiating step is carried out on said preform.

5. A method according to claim 1, wherein the radiation dose received by the ceramic fibers lies in the range of about 10 megarads to about 300 megarads.

6. A method according to claim 1, wherein the irradiation dose rate lies in the range of about 0.1 megarad/hour to about 10 megarad/hour.

7. A method according to claim 1, wherein the organometallic precursor is an organo-silicon precursor.

8. A method according to claim 1, wherein the irradiating step is performed at a temperature lying between ambient temperature and 1000° C.

9. A method according to claim 1, wherein the matrix of the composite material is selected from the group consisting of ceramic materials, vitreous materials, and vitroceramic materials.

* * * * *

UNITED STATES PATENT AND TRADEMARK OFFICE
CERTIFICATE OF CORRECTION

PATENT NO. : 5,296,171
DATED : March 22, 1994
INVENTOR(S) : Francois Christin, et al It is certified that error appears in the above-indentified patent and that said Letters Patent is hereby corrected as shown below:

Column 4, line 3, Example 3, on the last line of the table, "270" should read --207--.

Signed and Sealed this

Thirtieth Day of August, 1994

Attest:

BRUCE LEHMAN

Attesting Officer            Commissioner of Patents and Trademarks